March 12, 1935.  C. H. MARTENS  1,994,143
PROPELLER PITCH ADJUSTING MECHANISM
Filed Oct. 13, 1933  2 Sheets-Sheet 1
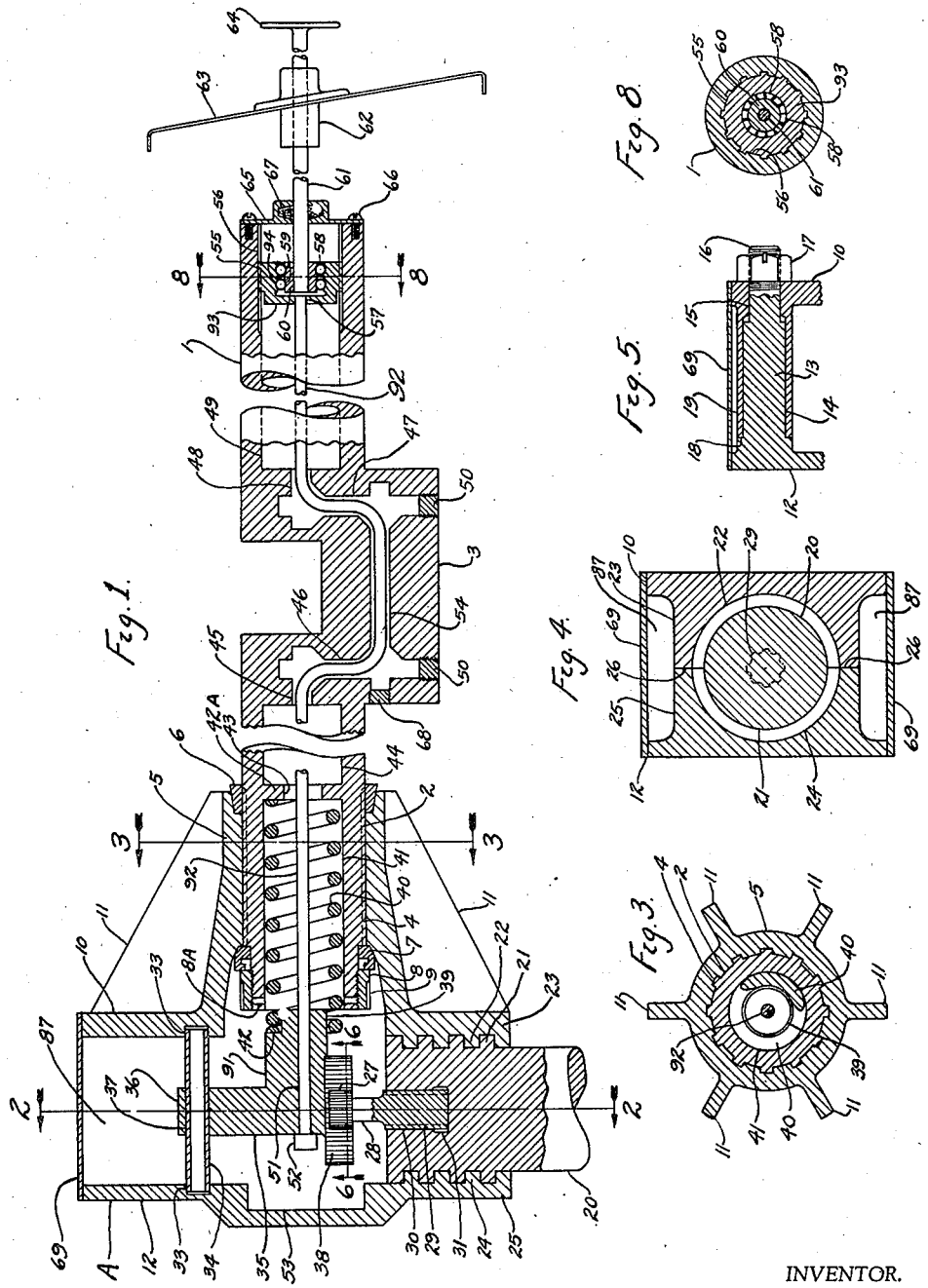
INVENTOR.
Charles H. Martens
BY
George C. Ingersoll
ATTORNEY.

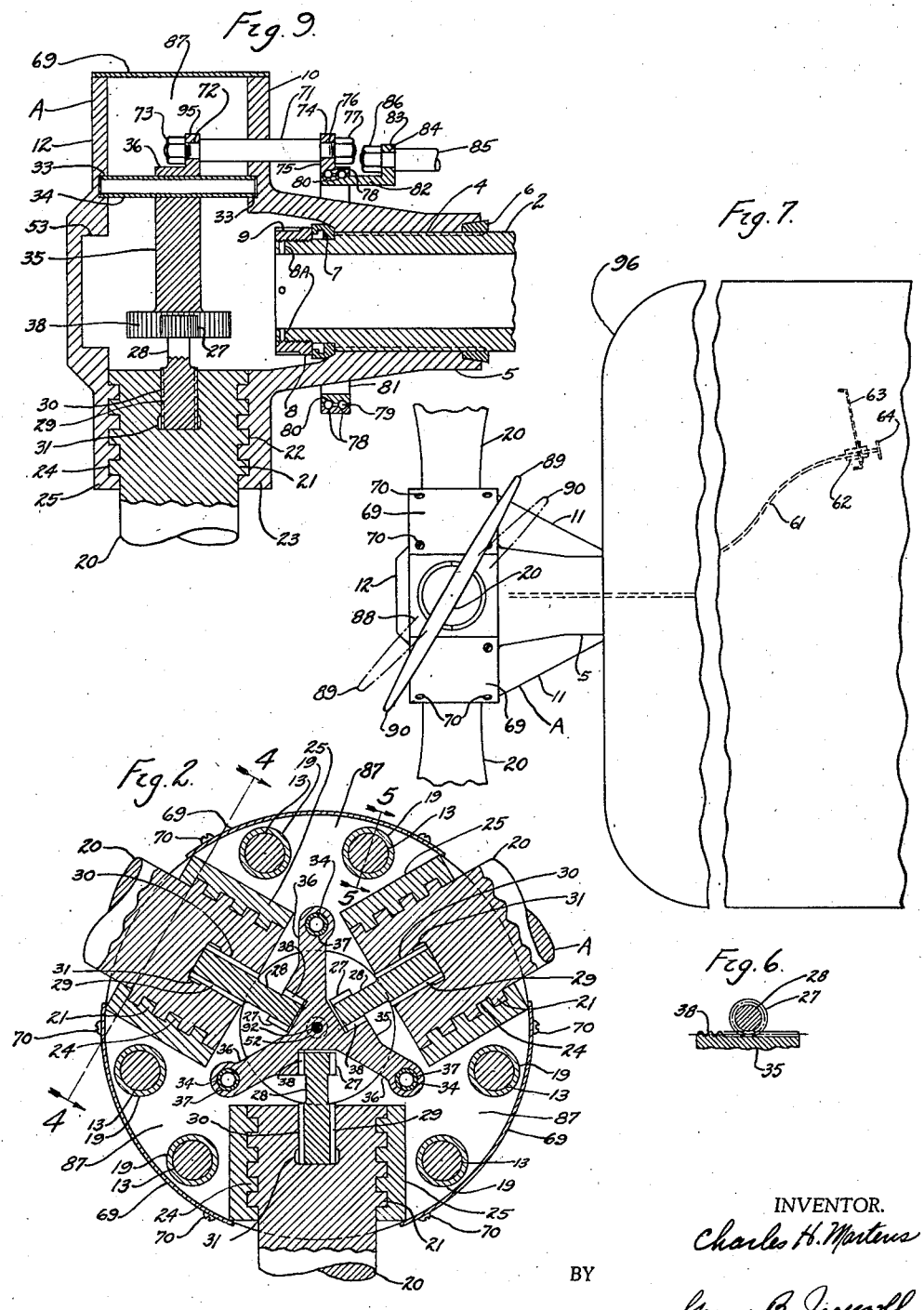

Patented Mar. 12, 1935

1,994,143

UNITED STATES PATENT OFFICE 1,994,143

PROPELLER PITCH ADJUSTING MECHANISM

Charles H. Martens, Bryan, Ohio

Application October 13, 1933, Serial No. 693,482

27 Claims. (Cl. 170—163)

My invention relates to improvements in propeller adjusting mechanisms in which the pitch of the propeller is adjustably controlled; and the objects of my improvement are, first, to provide a propeller adjusting mechanism capable of a complete 360 degrees of pitch adjustment range or any desired portion thereof regardless of the rotative speed or direction of rotation of the propeller drive shaft; second, to provide a propeller pitch adjusting mechanism having its actuating mechanism installed internally relative to the drive shaft upon which the propeller assembly is mounted; third, to provide a propeller pitch adjusting mechanism adapted to be actuated by control mechanism alternately located either internally or externally relative to a drive shaft supporting the propeller blade assembly; fourth, to provide a propeller pitch adjusting mechanism actuated by flexible shaft mechanism; fifth, to provide a rack and pinion adjusting mechanism located internally relative to the propeller blade assembly, the pitch of which is to be adjusted; sixth, to provide a propeller pitch adjusting mechanism having a multiple rack member reciprocatingly mounted within the propeller blade assembly; seventh, to provide a propeller blade hub mechanism formed by a pair of flanged members locked in driving relationship by a plurality of interlocking stud and sleeve members; eighth, to provide an adjusting thrust actuating mechanism capable of having a portion of itself rotate with the propeller blade assembly while the remaining portion of the thrust actuating mechanism remains fixed relative to the rotating portion of the mechanism; ninth, to provide a pair of thrust actuating shafts connected by a bearing member adapted to permit one of the shafts to rotate while the other one remains fixed against rotation; and tenth, to provide a propeller pitch adjusting mechanism actuated by a pair of thrust shafts connected by a bearing assembly capable of moving longitudinally with the thrust shafts while one of the shafts is revolving and the other of the shafts is fixed against rotation.

I attain these objects by mechanism illustrated in the accompanying drawings, in which—

Figure 1 is a sectional view of my adjusting mechanism applied to a propeller mounted on an extension which is an extension of a crankshaft and with the control mechanism extending through the crankshaft; Fig. 2, a vertical section through the mechanism disclosed in Fig. 1, said section being taken on the line 2—2, Fig. 1; Fig. 3, a sectional view through the hub portion of the propeller supporting mechanism and the crankshaft, said sectional view being taken on the line 3—3, Fig. 1; Fig. 4, a sectional view through the retaining mechanism of one of the propeller blades, said section being taken on the line 4—4, Fig. 2; Fig. 5, a sectional view through one of the stud and sleeve fastening units of the propeller hub, said sectional view being taken on the line 5—5, Fig. 2; Fig. 6, a sectional view through one of the pinions and racks of the adjusting mechanism, said sectional view being taken on the line 6—6, Fig. 1; Fig. 7, a side view of the propeller mechanism mounted on the front portion of the fuselage of an airplane; Fig. 8, a sectional view through the crankshaft and the adjusting mechanism, said sectional view being taken on the line 8—8, Fig. 1; and Fig. 9, a sectional view of my adjusting mechanism applied to a propeller where it is desired to construct the control mechanism externally relative to the driveshaft instead of internally as disclosed in Fig. 1;

Similar numerals refer to similar parts throughout the several views.

The crankshaft 1 is disclosed in Fig. 1 as the drive shaft for the propeller assembly A, which is mounted on an integral extension 2 thereof, the crankshaft 1 being represented as having a single throw or crank arm 3 as used in conventional radial engines with a single row of cylinders in which operate pistons operatively connected with the crank arm 3.

It is to be understood that my adjusting mechanism will be applicable to installations in crankshafts constructed with one or more crank arms 3.

To simplify the disclosure, the crankshaft 1 is represented without its operatively connected parts, such as cylinders, pistons, connecting rods, bearings, etc.

The extension 2 of the crankshaft 1 may be provided with standard S. A. E. or similar splines 4 on which is secured the hub 5 which will also be constructed with standard S. A. E. or similar splines to engage and fit the splines 4 of the extension 2.

The cone 6 is suitably anchored on the extension 2 and is provided with a tapered surface maintained in engagement with a similar tapered surface of the hub 5 by the cone 7 similarly provided with a tapered surface engaging a tapered surface at the forward end of the hub 5, the cone 7 being secured by the nut 8 which is threadably mounted at the outer end of the extension 2 of the crankshaft 1. The cones 6 and 7 are disclosed as being of standard S. A. E. construction. Also the nut 8 may be constructed from a standard S. E. A. propeller nut member by replacing the conventional drilled adjusting portion by the external splines 9 or their equivalent, for engaging a wrench, at the forward end of the nut 8, the nut 8 being thereby decreased in its overall length so that its outer end does not extend beyond the outer end of the extension 2.

The extension 2 will be provided with suitable holes 8A therein for receiving cotter pins or similar means for locking the nut 8 in its assembled position.

Although the cones 6 and 7 are disclosed as being of standard S. A. E. construction and the nut 8 is disclosed as being of modified S. A. E. construction, these retaining members may be varied to accommodate any desired type of crankshaft extension.

The hub 5 which is thus rigidly fixed to the extension 2 of the crankshaft 1, is provided with the flange 10 together with a plurality of strengthening ribs 11 suitably located and connecting the flange 10 with the hub 5.

The flange 12, which is removably mounted relative to the flange 10, is rigidly secured to the flange 10 in assembly by means of a plurality of studs 13 which may be constructed integrally with one of the flanges 10 or 12, said studs 13 being disclosed as being constructed integrally with the flange 12 and each fitting within a bore 14 of one of a plurality of sleeves 19 which may be constructed integrally with the flange 10, said flange 10 being further provided with the holes 15 for receiving the threaded ends 16 of the studs 13 therethrough, the flanges 10 and 12 and their engaged portions being locked together in their assembled position by the nuts 17 engaging the threaded ends 16 of the studs 13 and the inner surface of the flange 10. The studs 13 and sleeves 19 may be provided in any desired manner and with any desired spacing to eliminate interference with the ribs 11.

It is to be noted that the studs 13 will be provided with the shoulders 18 which are contacted by the ends of the sleeves 19 thus forming means for spacing the flanges 10 and 12 in their assembled positions.

The propeller blades 20 are provided with the stepped journal portions 21 which fit similar stepped bearing portions 22 in the bosses 23, which are integrally connected with the flange 10, and the stepped bearing portions 24 in the bosses 25, which are integrally connected with the flange 12, the bosses 23 and 25 being provided with surfaces which contact on the lines 26, as disclosed in Fig. 4, and form further means for spacing the flanges 10 and 12 in their assembled positions.

It is to be noted that the propeller blades 20 will have their stepped journal portions 21 suitably fitted relative to the stepped bearing portions 22 and 24 to properly fix the propeller blades 20 against longitudinal movement between the bosses 23 and 25 and yet allow the propeller blades 20 to be freely rotated about their own axes except for such restrictions as imposed through the pinions or gears 27, as hereinafter disclosed, any other form or manner of motion of the propeller blades 20 relative to the bosses 23 and 25 and the flanges 10 and 12 being prevented.

The pinions 27, one of which is provided for each of the propeller blades 20, may be constructed integrally with each of the shafts 28 which may be provided with spline portions 29 for engaging similar splines in the holes 30, provided with clearance spaces 31, of the propeller blades 20 to provide rigid securement with the propeller blades 20, or the shafts 28 may be otherwise suitably keyed to the propeller blades 20, or the shafts 28 may be constructed integrally with the propeller blades 20.

The flanges 10 and 12 are each provided with suitable recesses 33 for receiving the shafts or rods 34, which may be of tubular construction to eliminate weight, the shafts 34 being of sufficient size as to be pressed or otherwise fitted into said recesses 33 to maintain said shafts 34 in a rigidly fixed position relative to the flanges 10 and 12 together with the crankshaft 1, except that if it is desired, the shafts 34 each may be suitably mounted to permit rotation about its own axis.

The rack member or spider 35 is provided with the supporting arms 36, which may form integral portions thereof, and are each provided with a bore 37 which slidably engages one of the shafts 34, thus permitting the rack member 35 to freely slide along the shafts 34 except for restrictions imposed by the control mechanism connected therewith and hereinafter more fully disclosed.

The rack member 35, as its name implies, is provided with the plurality of racks or gear portions 38, each of which is adapted to engage or mesh with one of the pinions 27 of the propeller blades 20, said racks 38 having their gear teeth pitch lines extending parallel with the longitudinal axes of the propeller shaft assembly A and the crankshaft 1. The longitudinal or axial motion of the rack member 35 will cause rotation of the pinions 27 which in turn will cause the propeller blades 20 to rotate with a resultant pitch change of the propellers.

The longitudinal or axial position of the rack member 35 thus determines similarly and simultaneously the pitch setting of the propeller blades 20 and it is to be noted that the propeller pitch setting may be changed from forward to reverse or from reverse to forward and that any desired pitch setting may be obtained by the longitudinal or axial motion of the rack member 35, said rack member 35 being adapted to be moved longitudinally or axially in a fore and aft direction regardless of the rotative speed or direction of rotation of the crankshaft 1 and the propeller blade assembly A.

The rack member 35 is provided with the hub portion 91 and shoulder 42, said hub portion 91 being further provided with the pilot portion 39 which extends within and locates the outer end of the resilient member, spring, or equivalent member 40 which is suitably mounted in the recess 41 of the extension 2 and engages the stop member 42A constructed integrally with the crankshaft 1 at the bottom of the recess 41, the spring 40, at its outer end, engaging the shoulder 42 of the rack member 35.

The action of the spring 40 tends to move the rack member 35 to an extreme or outer position and to maintain said rack member 35 in said extreme position but by means of the flexible cable or shaft 92, the position of the rack member 35 may be maintained in any desired position against the thrust of the spring 40 to obtain any desired propeller pitch setting.

The crankshaft 1 is provided with the hole 43, in the shoulder 42A, connecting with the chamber 44 which in turn connects with the passages 45, 46, 47 and 48 in the cheeks of the crank arm 3, the passages 46 and 47 being connected by the passage 54. The passage 48 connects with the bore or chamber 49. The passages 46 and 47 may be drilled from the outer surface of the crank arm 3 and the outer ends of the passages 46 and 47 may be closed by the threaded plugs 50. Similarly the passage 54 may be closed by the plug 68.

The flexible shaft 92 extends through the hole 51 in the rack member 35 and is provided with the shouldered end 52 contacting the outer end of the rack member 35 to permit the flexible shaft 92, when a pull is exerted thereon, to move the rack member 35 inwardly against the thrust of the spring 40 to select the desired pitch setting of the propeller blades 20.

The flange 12 is provided with the recess 53 to provide operating clearance around the outer side of the rack member 35 when moved to its outer or extreme position.

The flexible shaft 92 extends through the chamber 41, the hole 51, the chamber 44, the passages 45, 46, 54, 47 and 48 and the chamber 49 to connect with the member 93 which is provided with the splines 55 which slidably engage the internal splines 56 at the end of the chamber 49, the end of the flexible shaft 92 being suitably and rigidly secured in the hole 57 of the member 93. Thus it is to be noted that the member 93 is driven by the crankshaft 1 to rotate synchronously therewith, said member 93 being further adapted to be moved longitudinally or axially, together with the flexible shaft 92, to operate the rack member 35 and the pinions 27 to adjust the pitch of the propeller blades 20.

The member 93 forms an outer race member provided with the raceways 94, in which the balls or similar antifriction members 58 operate, said balls 58 being further operatively mounted in the raceways 59 of the inner race member 60 which is rigidly secured to the shaft 61, which may be of flexible or rigid construction, said shaft 61 projecting out of the end of the crankshaft 1 oppositely disposed to the end supporting the propeller blade assembly A. The shaft 61 may be extended to and slidably mounted in the bracket 62 which may be suitably mounted on the instrument panel or similar supporting member 63, the the shaft 61 being provided with a button or handle member 64 at its end to facilitate the transmission of a pull or thrust on the shaft 61 by the operator. Also suitable means may be provided adjacent to 62 or elsewhere for locking the shaft 61 in any desired position. The instrument panel 63 may be located, as desired, to suit the convenience of the operator and when located out of alignment with the crankshaft 1, as indicated in Fig. 7, the shaft 61 will preferably be of flexible construction.

The oil retaining shield 65 is suitably attached to the crankshaft 1, by the screws 66 or similar means, and is provided with a central opening, through which the shaft 61 extends, together with the packing gland 67 or equivalent surrounding the shaft 61 to prevent leakage of oil from the chamber 49 of the crankshaft 1 when the shaft 61 is reciprocated.

It is to be noted that the shaft 61 and the inner race member 60 will remain stationary relative to the rotation of the crank shaft 1, the member 93, and the flexible shaft 92, the shaft 61 and the inner race member 60 being adapted to move longitudinally or axially and to transmit a thrust in either direction, through the medium of the balls 58 operatively connecting the race members 93 and 60.

It is to be understood that where it is desired to install my internal control mechanism in a straight shaft instead of in the crankshaft 1, said straight shaft being operatively driven by suitable connections with power means, the spring 40 may be dispensed with, the flexible shaft 92 being replaced by a rigid shaft or rod which can then be utilized to transmit a thrust in either longitudinal direction.

It is to be understood that my internal control mechanism, as above described, may be operated in a bath or mist of oil which may be supplied from the prime mover used for driving the propeller blade assembly A, the supply of oil being admitted to the interior of the propeller blade assembly A and the crankshaft 1, by suitable openings in the crankshaft 1 and by suitable conduit means connected with the main supply of oil in said prime mover. The oil retaining plates 69 are mounted around the outside of the flanges 10 and 12 and are secured therein by the screws 70, said oil retaining plates 69 being formed to the desired shape, said oil retaining plates 69 thereby closing the spaces, forming the chamber 87, between the bosses 23 and 25 of the flanges 10 and 12 to retain oil therein and to exclude foreign matter.

When it is desired to apply my propeller pitch adjusting mechanism to propeller drive shafts already constructed or for various other reasons where it is desired to apply the actuating mechanism on the outside of the drive shaft, the design of mechanism disclosed in Fig. 9 may be utilized.

The mechanism disclosed in Fig. 9, is practically identical with that disclosed in Fig. 1 with the exception that the rack member 35 is not provided with the actuating spring 40 or the hub 91 for supporting and receiving the thrust of the spring 40, the rack member 35 being provided, however, with the lugs 95 extending from the outer ends of the arms 36, said lugs 95 being secured to the thrust rods 71 which are each provided with a threaded portion 72 extending through suitable holes in said lugs 95, the threaded portions 72 being rigidly fixed in the lugs 95 by the nuts 73. The thrust rods 71 extend through suitable openings in the flange 10 and also through suitable openings in the lugs 74 of the member 75. The thrust rods 71 are each further provided with the threaded portion 76 which extends through the lugs 74 and are rigidly fixed therein by the nuts 77. The member 75 is provided with the raceways 78 in which are operatively mounted the ball or similar antifriction members 79 which are also operatively mounted in the raceways 80 of the member 81 which together with the member 75 constitute inner and outer race members of a bearing assembly capable of transmitting a thrust in either direction. The member 81 is provided with the extension portion or arm 82 which, in turn, is provided with the boss 83 having a suitable opening for receiving therethrough the threaded portion 84 of the actuating rod 85 which is rigidly fixed in the boss 83 by the nut 86. Longitudinal movement of the actuating rod 85, which is suitably restrained from rotation, will move the member 81 which in turn imparts movement, through the balls 79, to the member 75, the rods 71, and thus to the rack members 35 whose rack portions 38 engage and operate the pinions 27 to adjust the pitch of the propeller blades 20 in the manner as above described relative to the internal control mechanism.

The member 75 will extend telescopically around and rotate about the hub 5, while the member 81 will extend telescopically around the hub 5 but will be held in a fixed position relative to the rotating member 75 and the hub 5.

The thrust rod 85 together with the member 81 do not rotate with the extension 2 of the crankshaft 1 and the thrust rod 85 may be statically located at any angular position referred to the crankshaft 1 and its extension 2. Also it is to be understood that the member 75 and the parts rigidly fixed therewith always rotate synchronously with the crankshaft 1 and its extension 2.

It is also to be understood that means such as oil seals may be suitably employed to prevent oil leakage from the chamber 87 around the thrust rods 71 where they pass reciprocatingly through the flange 10.

Figure 7 discloses side view of the front end of the fuselage 96 of an airplane, together with the propeller blade assembly A mounted thereadjacent, one of the propeller blades 20 being indicated by full lines in a normal position and by dotted lines at 88 in an adjusted position relative to the normal position, the ends 89 and 90 of the propeller blade 20 being indicated by the dotted lines as having been adjusted through nearly the complete 360 degrees which my propeller pitch adjusting mechanism is capable of accomplishing.

It is understood that parts, methods and qualities disclosed in the drawing or description of any model of the propeller pitch adjusting mechanism may be transferred to any other model whose construction allows their use. Certain parts, methods and qualities of two or more models may be combined to form a new model.

Although all drawings are approximately to scale, any desired change in the relative or absolute size of any or all parts may be made. The drawings must not be construed as a rigid specification for the construction of any part, fitting or accessory whose change would not impair the intended function of the mechanism. It is intended that such class of accessories as oil seals, counterbalances, anti-friction bearings, safety devices, etc. may be used wherever required.

Any model may be designed to accommodate any number of propeller blades. The three blades generally shown must be regarded as a pictorial convenience only.

It is to be understood that the advantages of the commercial propeller pitch adjusting mechanism capable of complete 360 degrees of pitch adjustment range may be utilized in various fields of industry, such as heavier than air aircraft, lighter than air aircraft, helicopters, ornithopters, autogiros, air propeller driven automobiles, air propeller driven light weight rail cars, air propeller driven boats, marine type propellers for boats, and industrial installations of fans, blowers, pumps, hydraulic turbines, vacuum pumps, etc.

It is also to be understood that the application of my propeller pitch adjusting mechanism will accomplish, by its efficiency, reliability, and complete 360 degrees of pitch adjustment range, a great number of advantages and improved functions special to the various fields enumerated above.

I claim:

1. In a propeller pitch adjusting mechanism, the combination of a drive shaft rotatably mounted and provided with a passage extending therethrough, a hub mounted on said drive shaft and provided with a pair of flanges secured together to form said hub, shafts mounted in and extending between the flanges of said hub, propeller blades each rotatably supported in and relative to said hub, a pinion rigidly connected with each of said propeller blades and adapted to rotate therewith, a rack slidably mounted on said shafts to move axially relative to said hub, said rack being restrained from free rotation within said hub by said shafts, said rack being provided with a plurality of gear portions each engaging one of said pinions, a flexible shaft operatively connected with and adapted to move said rack, said flexible shaft extending through the passage of said drive shaft, a second shaft mounted for operative connection with said flexible shaft, and means operatively connecting said flexible shaft and said second shaft to transmit a pull from said second shaft to said flexible shaft to move said rack, said means permitting said second shaft to remain in a non-rotating position relative to said flexible shaft and said drive shaft.

2. In a propeller pitch adjusting mechanism, the combination of a hub rotatably mounted and provided with a chamber therein, propeller blades each rotatably mounted in and relative to said hub, a pinion connected with each of said propeller blades and adapted to rotate therewith, said pinion extending within the chamber of said hub, a rack in the chamber of said hub and provided with gear portions each engaging one of said pinions, means engaging said rack to restrain said rack from free rotation relative to said hub, and means operatively connected with and actuating said rack to rotate said pinions to adjust the pitch of said propeller blades.

3. In a propeller pitch adjusting mechanism, the combination of a drive shaft rotatably mounted and provided with a crank arm together with a passage extending through said drive shaft and its crank arm, propeller blades supported on said drive shaft and each rotatably mounted about its axis, and means for rotating said propeller blades each about its axis to adjust its pitch, said means including a flexible shaft extending through the passage of said drive shaft and its passage, said flexible shaft rotating with said drive shaft.

4. In a propeller pitch adjusting mechanism, the combination of propeller blades each rotatably mounted, gear and rack means operatively connected with said propeller blades to adjust the pitch thereof, means for restraining the rack of said gear and rack means from rotation relative to said propeller blades, and thrust transmission means for actuating the gear and rack means, said thrust transmission means including a pair of thrust members mounted in alignment and operatively connected by bearing means to permit one of said thrust members to be fixedly maintained against rotation relative to the other of said thrust members, one of said thrust members connecting said rack with said bearing means.

5. In a propeller pitch adjusting mechanism, the combination of a drive shaft rotatably mounted and provided with a crank arm together with a passage extending through said drive shaft and its crank arm, propeller blades each rotatably supported on said drive shaft, gear and rack means supported by said drive shaft and operatively connected with said propeller blades to adjust their pitch, a flexible shaft mounted in and extending through the passage of said drive shaft, said flexible shaft being operatively connected with said gear and rack means, means for moving said flexible shaft longitudinally to actuate said gear and rack means, and means for restraining said flexible shaft from rotation relative to said drive shaft.

6. In a propeller pitch adjusting mechanism, the combination of a drive shaft rotatably mounted, a hub mounted on said drive shaft, propeller blades each rotatably mounted in said hub, gears mounted in each propeller and adapted to rotate therewith, a rack slidably mounted within said hub and provided with a plurality of rack portions for operating said gears, means for restraining said rack from free rotation relative to said hub, resilient means mounted in said drive shaft and adapted to move said rack in one direction, a flexible shaft mounted in said drive shaft and operatively connected with said rack to actuate said rack in an opposite direction against the thrust of said resilient means, means for restraining said flexible shaft from rotation relative to said drive shaft, and means for transmitting a pull to said flexible shaft.

7. In a propeller pitch adjusting mechanism, the combination of a drive shaft rotatably mounted, a hub member suitably mounted on said drive shaft, propeller blades suitably mounted in said hub member to permit each of said propeller blades to rotate about its own axis, gear members suitably mounted and operatively connected with each of said propeller blades, each of said gear members being located axially with said propeller blades, shaft members suitably mounted in and arranged radially around the axis of said hub, an actuating member slidably mounted on said shaft members and provided with a rack portion for engaging each of said gear members, and means for moving said actuating member.

8. In a propeller pitch adjusting mechanism, the combination of a hub rotatably mounted and provided with a chamber having oppositely disposed wall portions, shafts mounted in the oppositely disposed wall portions of said hub and extending therebetween, propeller blades each rotatably mounted in said hub, means mounted to move parallel with the axis of said hub and provided with racks operatively connected with said propellers to accomplish a pitch adjusting movement thereof, said means being movably supported on said shafts, and means for actuating said first mentioned means.

9. In a propeller pitch adjusting mechanism, the combination of a hub provided with a closed chamber, a drive shaft supporting said hub and provided with a passage connecting with the closed chamber of said hub, propeller blades rotatably mounted in said hub, a rack member located wholly within said closed chamber and operatively connected with said propellers, a pair of thrust transmitting members mounted in the passage of said drive shaft and operatively connected with said rack member, means connecting said thrust transmitting members and adapted for longitudinal movement, said means permitting rotation of one of said thrust transmitting members relative to the other, and means for restraining said other of said thrust transmitting members from rotation relative to said drive shaft.

10. In a propeller pitch adjusting mechanism, the combination of a drive shaft rotatably mounted and provided with a passage therethrough having internal splines at one of its ends, propeller blades mounted on said drive shaft, a member provided with portions slidably engaging said internal splines and causing said member to rotate with said drive shaft, a flexible shaft connected with said member and adapted to rotate therewith, a second shaft within said drive shaft and operatively connected with said member to permit said second shaft to remain fixed against rotation, a rack and gear mechanism operatively connected with said flexible shaft and with said propeller blades, and means for actuating said flexible and said second shafts to operate said rack and gear mechanism to adjust the pitch of said propeller blades.

11. In a propeller blade pitch adjusting mechanism, the combination of a hub member for supporting the propeller, a plurality of shaft members extending between the portions of said hub members and arranged radially about the axis of said hub member, means for adjusting the pitch of the propeller blades, said means being movably mounted on said plurality of shaft members, a bearing assembly suitably mounted and comprising outer and inner race members, said bearing assembly being adapted to move longitudinally, means operatively connecting one of said race members of said bearing assembly with said first mentioned means and a thrust member suitably mounted and operatively connected with the other of said race members of said bearing assembly.

12. In a propeller pitch adjusting mechanism, the combination of propeller blades rotatably mounted about a common axis, said propeller blades each being further rotatably mounted about its own axis, and means suitably mounted to move along said common axis to cause said propeller blades to rotate through 360 degrees for pitch adjusting purposes, said means being operatively connected with said propeller blades, said means comprising a member provided with a hub portion having a plurality of supporting arms together with rack portions located on the sides of said supporting arms between its hub portion and the supporting portions of said supporting arms.

13. In a propeller pitch adjusting mechanism, the combination of a hub member rotatably mounted, propeller blades radially disposed in said hub member, each of said propeller blades being further rotatably mounted about its own axis, torque transmitting members suitably mounted in each of said propeller blades and extending from the inner ends of said propeller blades, a second torque transmitting member mounted in said hub member and adapted to move longitudinally of said hub member to operate said first mentioned torque transmitting members, means for restraining said second torque transmitting member from rotating relative to said hub member, and means for actuating said second torque transmitting member, a portion of said means being permitted to rotate, the remaining portion of said means being fixed against rotation.

14. In a propeller pitch adjusting mechanism, the combination of a hub provided with a flange having semi-circular shaped boss portions extending therefrom, a second flanged member mounted adjacent the flange of said hub and provided with semi-circular shaped boss portions engaging the semi-circular shaped boss portions of said hub, said second flanged member forming a closure member extending across the outer end of said hub, the semi-circular shaped boss portions of said hub and said second flanged member forming circular shaped boss portions having stepped bearing surfaces, propeller blades provided with stepped journal surfaces and rotatably mounted in the stepped bearing surfaces of said second flanged member and said hub, means for securing said second flanged member and said hub together, and means for adjusting the pitch of said propeller blades.

15. In a propeller pitch adjusting mechanism, the combination of a hub member rotatably mounted, said hub member comprising a pair of flanged members each provided with a plurality of radially disposed projections extending longitudinally in planes parallel with the axis of the said shaft member, the projections of one of said flanged members telescopically fitting the projections of the other of said flanged members to provide driving means therebetween, means for fastening said pair of flanged members together, said means extending longitudinally through said projection, propeller blades radially disposed in said hub member and suitably mounted to permit rotation of each of said propeller blades about its axis, and means suitably mounted in said hub member to engage and operate said propeller blades to pitch adjusting positions, and means for actuating said first mentioned means.

16. In a propeller pitch adjusting mechanism, the combination of a hub member rotatably mounted, said hub member comprising a pair of flanged members, one of said flanged members having a plurality of sleeve portions extending therefrom, in planes located parallel with the axis of said hub member, said sleeve portions being arranged radially around the axis of said hub member, the other of said flanged members having a plurality of stud portions extending longitudinally through the sleeve members of the other of said flanged members, fastening means for securing said stud portions in said sleeve portions, said fastening means extending through said stud and sleeve portions together with one of said flange members, propeller blades suitably mounted in said hub member, and means for adjusting the pitch of said propeller members.

17. In a propeller pitch adjusting mechanism, the combination of a hub member rotatably mounted, said hub member comprising a pair of flanged members suitably secured together and provided with a chamber therebetween, propeller blades suitably mounted in said hub member and each adapted for rotation about its own axis, means suitably mounted in said hub member and operatively engaging said propeller blades to adjust the pitch thereof, and a plurality of segmental members suitably secured to said hub member between said propeller blades to close the peripheral sides of the chamber of said hub member, said segmental members extending between said propeller blades only.

18. In a propeller pitch adjusting mechanism, the combination of a hub member rotatably mounted, propeller blades each suitably mounted in said hub member to permit rotation about its axis, gear members suitably connected with each of said propeller blades and adapted to rotate therewith, a member provided with a plurality of radially extending arms each provided with a bore therethrough, said arms being further provided with rack portion thereon for engaging one of said gear members, shafts suitably supported in said hub member and slidably engaging the bores of said arms of said member, and means for actuating said member to rotate said propeller blades to adjust the pitch thereof.

19. In a propeller pitch adjusting mechanism, the combination of a hollow hub rotatably mounted, propeller blades each rotatably mounted in said hollow hub, a gear member supported concentrically with each of said propeller blades and within said hollow hub, a rack member engaging said gear member of each of said propeller blades, said rack member being contained within said hollow hub, means for supporting said rack member, said means restraining said rack member from rotation relative to said hollow hub, said means being contained within said hollow hub, and means for actuating said rack member.

20. In a propeller pitch adjusting mechanism, the combination of a drive shaft, a hub member mounted on said drive shaft, propeller blades suitably mounted in said hub member, gear members supported by said propeller blades, a rack member provided with a hub portion extending between and adjacent the innermost surfaces of said gear members, said rack member being provided with radially extending arms provided with bores at their ends, said rack member being provided with rack portions located between said hub portion and said bores, said rack portions engaging said gear members, shaft members mounted in said hub member and extending longitudinally in planes parallel with the axis of said rack member, said shaft members engaging the bores of the radially extending arms of said rack member, and means for actuating said rack member.

21. In a propeller pitch adjusting mechanism, the combination of a drive shaft provided with a passage extending therethrough, a bearing assembly mounted within the passage of said drive shaft and comprising a pair of race members, propeller blades suitably supported by said drive shaft, means for rotating each of said propeller blades about its axis, a sole shaft member connected with said means and with one of the race members of said bearing assembly, said shaft member extending through the passage of said drive shaft, and a second shaft member suitably mounted and connected with the other race member of said bearing assembly.

22. In a propeller pitch adjusting mechanism, the combination of a drive shaft provided with a passage extending therethrough, said passage being provided with internal splines, a race member provided with external splines engaging the internal splines of the passage of said drive shaft, said race member being slidably mounted in the passage of said drive shaft, propeller blades suitably supported by said drive shaft, means for rotating said propeller blades axially, a flexible shaft member connected with said means and said race member, a second race member extending within said first mentioned race member, rollably mounted means operatively engaging said first mentioned and said second race members, and means for exerting a thrust or a pull on said second race member, said means being operatively connected with said second race member.

23. In a propeller pitch adjusting mechanism, the combination of propeller blades suitably mounted, means for rotating each of said propeller blades about their axes, a bearing member movably mounted and provided with a bore extending axially therein and provided with a second bore having a raceway extending therearound, a second bearing member extending within said second bore of said first mentioned bearing member and provided with a cylindrical surface having a raceway extending therearound, rollably mounted members mounted between and engaging the raceways of said first mentioned and said second bearing members, said second bearing member being supported within said first mentioned bearing member solely by said rollably mounted members, means connecting said first mentioned bearing member with said means for rotating each of said propellers about their axes, and means for exerting a thrust on said second bearing member to move said first mentioned bearing member.

24. In a propeller pitch adjusting mechanism, the combination of a drive shaft provided with a crank arm together with a passage extending through the drive shaft and its crank arm, propeller blades suitably supported on said drive shaft, means for rotating each of said propellers about their axes, a member mounted in the passage of said drive shaft and adapted for movement longitudinally thereof, means restraining said member from rotating within the passage of said drive shaft and a flexible shaft having substantially equal cross sectional areas throughout its length, said flexible shaft being operatively connected with said first mentioned means, said flexible shaft being fixedly secured to member, said flexible shaft being adapted to transmit a pull exerted by said member to said first mentioned means.

25. In a propeller mechanism, the combination of a drive shaft rotatably mounted, a hub mounted on said drive shaft and provided with boss portions arranged radially thereon to form a space between the inner ends of said boss portions, said boss portions further forming a plurality of spaces between their sides in said hub, propeller blades each rotatably mounted in one of said boss portions of said hub, means for adjusting the pitch of said propeller blades, said means being located in said space between the inner ends of said boss portions of said hub, and members secured to the outside of and between said boss portions of said hub to close said spaces between said boss portions of said hub.

26. In a propeller mechanism, the combination of a drive shaft rotatably mounted, a hub mounted on said drive shaft and comprising a pair of flanged members each provided with a plurality of radially disposed projections, the radially disposed projections of one of said flanged members telescopically engaging the radially disposed projections of the other of said flanged members to provide driving connections between said pair of flanged members, said pair of flanged members being further provided with boss portions radially disposed and forming spaces around said radially disposed projections, means for fastening said pair of flanged members together, said means forming a portion of the radially disposed projections on one of said flanged members and extending longitudinally through the radially disposed projections of the other of said flanged members, propellers rotatably mounted in each of said boss portions of said hub, members secured to the outer surface of said hub between said boss portions and over said radially disposed projections to close said spaces around said radially disposed projections, and means for adjusting the pitch of said propellers.

27. In a propeller mechanism, the combination of a drive shaft rotatably mounted, a hub mounted on said drive shaft and comprising a pair of flanged members secured together to provide a chamber, the outermost of said flanged members being provided with a recess located concentrically with the axis of the propeller mechanism, said flanged members being provided with boss portions arranged radially, propeller blades each rotatably mounted in one of said boss portions, and means for adjusting the pitch of said propellers, said means being operatively connected with said propellers, said means being supported adjacent the inner ends of said boss portions to move axially of the propeller mechanism and within said recess of said outermost flanged member, said recess providing additional clearance space for the operation of said means.

CHARLES H. MARTENS.